March 20, 1956 R. W. SCHEDE 2,739,286
ALPHA SURVEY METER CIRCUIT
Filed Sept. 1, 1950
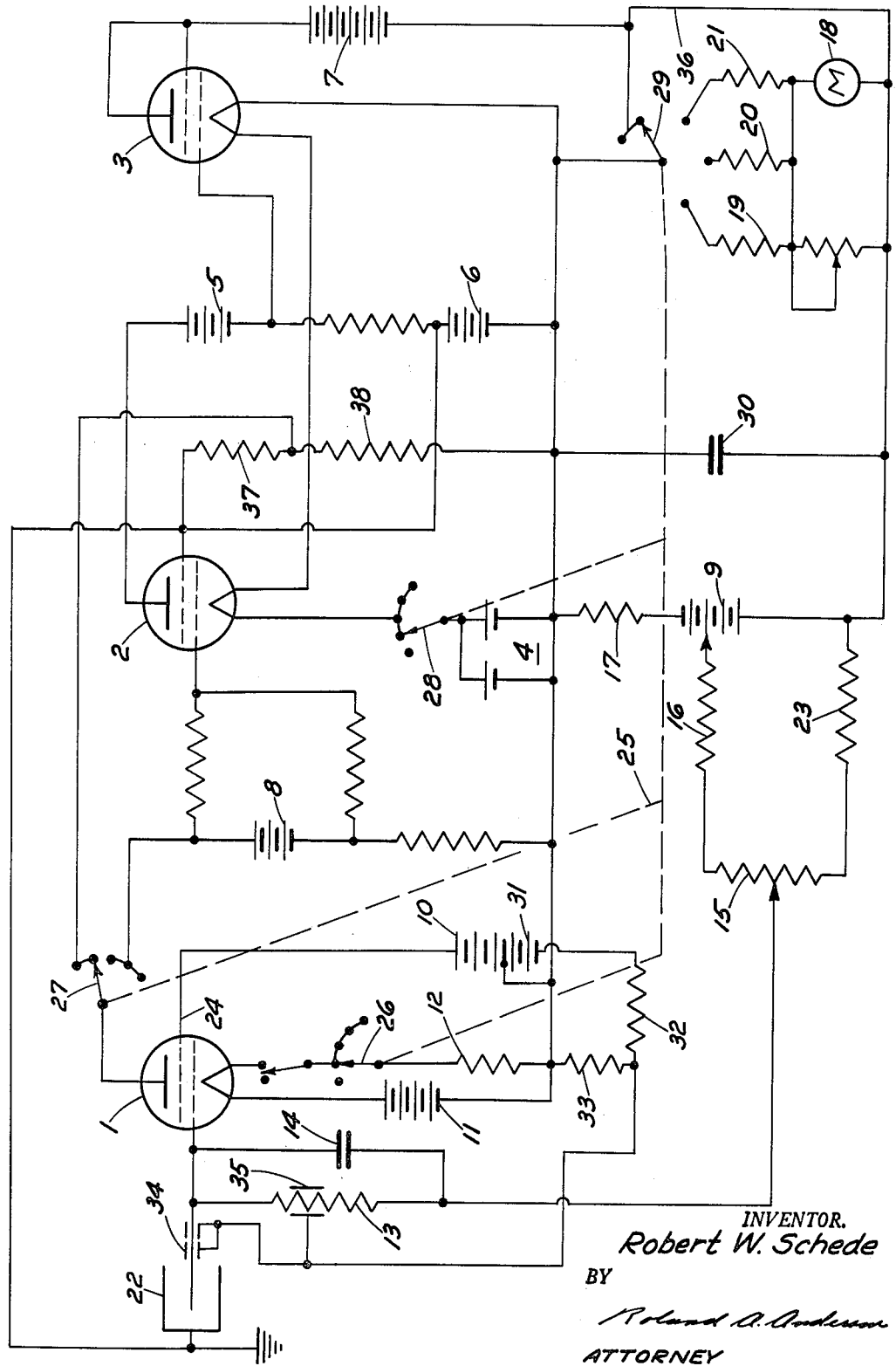
INVENTOR.
Robert W. Schede
BY
Roland A. Anderson
ATTORNEY

United States Patent Office 2,739,286
Patented Mar. 20, 1956

2,739,286

ALPHA SURVEY METER CIRCUIT

Robert W. Schede, Oak Ridge, Tenn., assignor to the United States of America as represented by the United States Atomic Energy Commission Application September 1, 1950, Serial No. 182,845

5 Claims. (Cl. 324—123)

My invention relates to an improved electronic circuit, and more especially to a highly sensitive, fast, yet stable electronic amplifier having especial novel compensating features for minimizing drift.

In measuring very minute direct currents, such as those from radiation-sensitive ion chambers, considerable amplification of current is necessary to operate an indicating meter or other device. The D. C. current amplifier has been widely used to provide the necessary currents, and has incorporated tubes of a special type known as electrometer tubes. These tubes are generally very small, for portability, and are operated at very low electrode voltages, in order to reduce grid current.

The greatest difficulty encountered in field use of D. C. amplifiers is the tendency of the indicator to drift, or change, independently of any signal change. In a radiation survey instrument, for example, the meter needle may drift slowly away from the zero position even though no radiation strikes the instrument, and the meter will have to be recalibrated before accurate readings can be again taken. In portable instruments, a major cause for such drift is the decay of certain battery voltages with time. The filament battery, for example, may so deteriorate in use that the voltage it produces drops 1% in one hour of use. A second major cause of drift is the familiar change in tube characteristics with age, causing a corresponding change in the current amplification of each tube. The indicator needle of best available survey meters of the prior art may be caused to drift 5% or more of full scale per hour of use. Thus, it is apparent that after a day's field use the meter indication would be so far off calibration as to be meaningless. For obvious reasons, military and even routine field surveyors, away from calibration equipment, must have a draft free amplifier.

Because of that demand, a primary object of my invention is to provide an extremely sensitive amplifier circuit which is relatively free from drift.

A further object of my invention is to provide a portable, battery operated, inverse feedback D. C. amplifier for use with conventional ionization chambers in detecting radiations such as alpha particles.

Another object of my invention is to provide a novel circuit for and method of compensating for decay of filament and/or screen grid voltage sources.

Yet another object of my invention is to provide an amplifier of novel design adapted to minimize the effects of leakage currents.

Still another object of my invention is to provide a novel electronic amplifier for use with ion chambers which will degenerate the effect of the chamber capacity and any leakage currents of chamber or tube.

Other objects and advantages of my invention will be apparent from the following description of a preferred embodiment thereof, when read in conjunction with the appended drawings, in which:

The figure is a schematic diagram of a radiation survey meter embodying the principles of my invention.

Referring now to the figure, three electron tubes 1, 2, and 3 are connected to form a feedback current amplifier. Tube 1 may be an electrometer tube of the type CK571AX, a sub-miniature, low filament current, described in the Raytheon Manufacturing Corporation's Tube Data Sheet CS–2494, Revision 1, of October 12, 1949.

Tubes 2 and 3 are preferably of the type CK512AX which are low filament current, subminiature, electrometer pentodes, and are described in Raytheon pamphlet "Tube Characteristics" at pp. 3–4. Batteries 4–11 furnish electrode voltages and filament currents for the tubes. The compensating resistor 12 of 100 ohms value is inserted in the filament circuit of tube 1, while the input resistor 13 of $5 \times 10^{12}$ ohms is connected to the input grid of that tube and shunted by 1.5 mmfd. capacitor 14. The resistor 13 is returned to the arm of a potentiometer 15, through resistor 16 to a tap on battery 9, and through resistor 17 to the filament circuit. The output of tube 3 is fed back through resistor 23 and potentiometer 15 to the input circuit at the junction of resistor 13 with capacitor 14. Potentiometer 15 is connected in a voltage divider network across a part of bias battery 9, and may be adjusted to balance out the effect of current through meter 18 caused by background radiations incident on chamber 22. The movable contact of the potentiometer is connected to the resistor 13 in the grid circuit to form part of the feedback loop. Filament battery 4 should furnish 1.25 volts, and two 1.25 volt mercury cells, connected in parallel, have proven satisfactory. Battery 11 should furnish 2.5 volts, and two 1.25 volt cells connected in series are preferred. The 22½ volt hearing aid type batteries may be employed as B batteries 8, 5, and may be series connected to furnish 45 volts in battery 7. A 7½ volt battery may be tapped at 4½ volts to furnish second grip supply 10 and the same type battery may be connected as the bucking battery 9. It has been found that by connecting the second grid-like structure of the tube CK571AX, intended as a mechanical brace, to a source of, for example, 4½ volts, a gain of 20–50 may be obtained, where no gain is obtainable in the normal triode connection recommended by the manufacturer.

In operation, when radiation falls upon chamber 22, it ionizes the filling gas. Positive ions are collected on the center electrode, causing a charge to flow through input resistor 13.

That current flow is amplified by the three amplifier stages and flows through meter 18 in the third stage. The output voltage is fed back to the input resistor through resistor 23 and potentiometer 15. The amplifier shown has a current amplification of 500 million and a voltage amplification of substantially 1.

Various novel features contributing to the over-all stability and sensitivity of the present invention will be described in more detail hereinafter.

As is well known, the normal voltage decay of a filament battery causes a gradual decline in plate current. This produces undesirable circuit drift. To minimize such drift, the filament circuit of tube 1 is provided with a 2.5 volt supply 11 (the filament is rated at 1.5 volts) and with a compensating resistor 12, connected as shown. The grid circuit is connected to the negative side of source 11. With this arrangement, the average grid bias decreases considerably as the filament voltage decays, thus minimizing plate current decline resulting from lower filament emission. Assuming that plate current is proportional to the average grid bias, it is evident that merely connecting the control grid circuit to the positive side of the filament will not accomplish such compensation, for with this connection the average grid bias increases considerably as filament voltage drops. A return to a center-tapped resistor maintains the average grid bias constant, and thus will not provide compensation. A return to the negative side of the filament would provide some compensation, but in the circuit of Fig. 1 this would not be sufficient to offset the voltage decay of source 11. The screen grid 24, however, is returned to the negative side of the filament, as shown, or to the negative terminal of the filament source, so as to provide additional compensation.

Before the compensating resistor 12 is connected as shown, its optimum value must be determined. I have found that this may be done by decreasing the filament voltage by small decrements, and noting in each case how much decrease in grid bias is required to maintain plate current constant. The data so obtained is used to solve this equation:

$$\frac{\text{Desired resistance from filament midpoint to compensating point}} = \frac{\text{Average change in grid bias required to keep plate current constant}}{\text{Average change made in filament voltage}}$$

The suitable value of resistor 12 then is found by subtracting one-half of the tube filament resistance from the value derived in the preceding equation. This calculated value of the resistor is an approximation, as the control grid voltage and the plate current are assumed to have a linear relationship and as the filament resistance is assumed to remain constant.

Another one of the important features of this circuit is the high value of the input resistor, $5 \times 10^{12}$ ohms. In general, the use of such high value resistors has been avoided because of the increase in time response and the aggravation of the leakage problem. Where a high gain feedback circuit is used these problems are effectively eliminated. The very important advantage to be gained from using a larger resistor with this circuit is that if a constant output current sensitivity is desired, the millivolt output sensitivity is decreased proportional to the increase in size of the input resistor. To further explain this: if a $5 \times 10^{12}$ ohm resistor is used the sensitivity may be 200 mv. full scale for $4 \times 10^{-14}$ amp. sensitivity, and if a $1 \times 10^{12}$ ohm resistor, the sensitivity is 40 mv. full scale. Thus, it is obvious that any drift resulting from a change in the tube characteristics or battery voltages is one-fifth as troublesome with the $5 \times 10^{12}$ ohm resistor, and any drift resulting from a fluctuation in input tube grid current is equal for all values of input resistance.

The upper limit to the size of input resistance which can be used is determined by the allowable voltage swing available from the final stage on the low sensitivity range and the longest allowable time response resulting from the use of the shunt capacitor which improves the alternating response of the feedback loop. With the size chamber used and the input wiring arrangement used this upper limit is between $5 \times 10^{12}$ ohms and $1 \times 10^{13}$ ohms.

The position of the zero adjusting control in a feedback electrometer tube amplifier having a large input resistor is very important with regard to the ease with which the instrument may be zeroed. If the zeroing is done, for example, on the screen of the input tube, or any other place in the cascaded amplifier stages, adjustment is difficult because of the overshoot encountered. This overshoot results from the poor transient response of the feedback loop which is due to the long time constant of the network 13, 14. The small change of voltage appearing at any place in the amplifier other than the loop will be instantaneously amplified without regard to the feedback of the circuit, and will result in a large undesirable meter deflection. I have found that to eliminate this difficulty the zero adjusting control must be placed in the feedback loop. If so arranged, before the effect of an adjustment can be amplified and appear on the output meter, it has to pass through the RC input combination, which both attenuates and slows the signal. Another advantage of zeroing in the feedback loop is that the zeroing voltage compensates directly for variations in input tube control grid voltage variations, which is the major effect to be zeroed out.

A further novel feature of the circuit I have invented lies in the switching arrangements employed. Ganged switch 25 carries arms 26, 27, 28, and 29. In the most counterclockwise, or "off" position, arm 29 is connected to wire 36, by-passing meter 18 and resistors 19, 20, 21, and shorting capacitor 30, so that the potential at the input grid will be maintained at its normal operating potential by battery 9. By so maintaining grid potential even when the amplifier is not operating, undesirable spurious meter deflections due to slow charging of the various grid capacities through the large resistor 13 may be avoided; moreover, the necessary warm-up time before the amplifier stabilizes is materially reduced. To still further reduce the necessary warm-up time, I have provided a switch arm 27 in the plate circuit of tube 1. The most counterclockwise, or "off" tap contacted by arm 27 is tied to the junction of screen resistors 37, 38, connected across the screen battery 6, so that the plate of tube 1 is maintained at a substantially constant potential of about 6 volts in either "on" or "off" positions. I have found that by thus keeping the control grid-filament and plate-filament voltages substantially constant, "off" and "on," the surge grid current of tube 1 is greatly reduced, and the warm-up time required before stabilization is materially shortened.

Arms 26 and 28 open the filament circuits, deenergizing the amplifier, when they are in the most counterclockwise position.

In the second and all subsequent clockwise positions, arms 26 and 28 close the filament circuits. The second contacts are connected to the first or most-counterclockwise contacts in the switches in the anode circuits of tubes 1, 3. Thus, those circuits are not closed until the ganged switch is turned to the third position, proceeding clockwise. The arm 29 inserts one of three resistors 21, 20, 19 into the anode circuit of tube 3 as the switch is thrown to the third, fourth, and fifth, or most clockwise, positions, and serves as a sensitivity control for the system.

When the present amplifier is utilized with a radiation detector such as an ion chamber, it is desirable that the input grid of tube 1 be maintained at very nearly the same potential as the guard ring of the chamber. If several instruments are to be built, this desired result cannot be obtained in practice because of tube to tube variation in the filament-control grid voltage. But if the otherwise unused three volt section 31 of battery 10 be connected across resistors 32, 33, a potential very nearly equal to that on the input grid may be provided at guard rings 34, 35. Therefore, when the amplifier is turned on, the capacity of grid to guard ring is already charged, avoiding meter fluctuations and reducing warm-up stabilizing time.

Yet another novel feature which I have provided in the present invention is directed towards reducing the effects of microphonics on the amplifier output. As is well recognized, the radiation survey instruments especially, and portable electronic circuits in general, are very susceptible to voltage fluctuations caused by loud noises or by even lightly jarring or striking the chassis of an instrument. To overcome this defect, I provide my amplifier with a physical shield of the common metal type and maintain that shield at the guard ring potential by means of a spring contact on the shield which contacts the guard ring. I have found that by such connection the effect of microphonics is largely eliminated.

It is, therefore, apparent that I have provided an amplifier circuit characterized by the desirable features of high sensitivity, negligible drift, greatly reduced stabilization or warm-up time, and insensitivity to microphonics. While my invention has been described in connection with a circuit designed for a particular application, it will be apparent to those skilled in the art that the invention is not limited to any specific circuit, but the principles thereof may be employed in other electronic circuits and for general uses other than with radiation detectors. Hence, it is intended that the foregoing disclosure and drawing be considered only as illustrative and not be construed in a limiting sense, the only limitations being determined by the scope of the appended claims.

What I claim as novel is:

1. In an electronic feedback amplifier including at least one electric discharge device having cathode, grid, and anode electrodes and having input and output circuits comprising a source of potential and a load resistor, an input resistor coupled to said grid, a feedback loop connected between said input and output circuits, and means for indicating the magnitude of current flow in said output circuit, means for rapidly adjusting said indicating means to a zero position without overshoot and for simultaneously compensating for variations in electrode operating voltages in said input circuit comprising a potentiometer connected in shunt with at least a part of said potential source in said feedback loop, the arm of said potentiometer being connected to said input resistor for adjusting the voltage applied to said grid.

2. In an amplifier stage comprising an electric discharge device having a filament, a control grid, a second grid, and an anode, a source of current in series with said filament provided with a negative terminal forming a point of reference potential, a source of potential coupled between said anode and filament, a source of second grid potential having its positive terminal connected to said second grid, a first resistor coupled between said grid and said negative terminal, and a source of control grid potential connected between said resistor and said filament, improved means for compensating for the changes in anode current caused by changes in filament current comprising a compensating resistor having opposite terminals connected directly to one leg of said filament and the negative terminal of said current source, and a direct connection between the negative terminals of both said source of second grid potential and said current source, whereby grid bias for both control and second grids depends upon the drop across said compensating resistor from said filament current.

3. In an amplifier, a first amplifier stage according to claim 2, a feedback resistor connected between said source of control grid potential and said filament source, and at least one additional amplifier stage provided with an input circuit coupled to the anode of said first stage and an output circuit coupled to said resistor to deliver thereacross a current proportional to the anode current in said first stage, whereby changes in said anode current effect corresponding changes in control grid bias in said first stage.

4. In a feedback amplifier circuit, a first electric discharge device having at least anode, filament, and grid electrodes, a load resistor and a first source of potential connected in circuit with said anode and filament; a second electric discharge device having at least anode, filament and grid electrodes and coupled to said first device, second and third potential sources and a feedback resistor coupled in the order named in an output circuit between said anode and filament of said second device; a point of common reference coupled to said filaments and said feedback resistor; an input resistor having one terminal coupled to the grid of said first device and the other terminal coupled to said third potential source to derive a bias potential therefrom and from the voltage drop across said feedback resistor; an indicator connectible in said output circuit; respective filament current sources for energizing said devices; and ganged switching means comprising a first switch provided with an arm connected to said reference point, first and second position contacts both connected to the positive terminal of said third potential source to cause current flow through said feedback resistor in the absence of flow of anode current therethrough from said second device, and a third position contact coupled through said indicator to said third source positive terminal to insert said indicator in said output circuit in shunt with said feedback resistor and third source; second and third switches having respective arms coupled to said respective filament current sources, respective first position contacts disconnected to open circuit said filaments when contacted, and respective second position contacts connected to corresponding filaments to energize the filaments when contacted by said arms; and a fourth switch having an arm coupled to said first device anode, first and second position contacts coupled to a source of constant potential for maintaining the anode potential when said filament is deenergized, and a third position contact coupled to said first potential source for maintaining anode-filament potential when said filament is energized.

5. A drift-free amplifier comprising a first electric discharge device having at least a filament, a grid, and an anode, a point of electrical reference, a source of anode potential coupled between said anode and said point, a source of filament current having a positive terminal connected to one leg of said filament and a negative terminal connected to said point, an input resistor and a source of voltage coupled in series between said grid and said reference point, and a compensating resistor connected to the other leg of said filament and to said point, to decrease the negative grid-to-filament bias responsive to a decrease in filament current.

References Cited in the file of this patent

UNITED STATES PATENTS

| Number | Name | Date |
| --- | --- | --- |
| 1,699,733 | Batsel | Jan. 22, 1929 |
| 1,728,879 | Rice et al. | Sept. 17, 1929 |
| 1,926,568 | Walz | Sept. 12, 1933 |
| 2,146,761 | Philpott | Feb. 14, 1939 |
| 2,170,050 | Gandtner | Aug. 22, 1939 |
| 2,245,616 | Soller | June 17, 1941 |
| 2,273,987 | Pineo | Feb. 24, 1942 |
| 2,324,797 | Norton | July 20, 1943 |
| 2,354,718 | Tuttle | Aug. 1, 1944 |
| 2,418,284 | Winchel et al. | Apr. 1, 1947 |
| 2,434,297 | Test et al. | Jan. 13, 1948 |
| 2,452,880 | Van Beuren | Nov. 2, 1948 |
| 2,458,659 | Vingerhoets et al. | Jan. 11, 1949 |
| 2,496,886 | Malloy et al. | Feb. 7, 1950 |
| 2,512,138 | Butt | June 20, 1950 |